Aug. 23, 1932.  T. W. CASE  1,872,675
CELL AND METHOD OF MAKING THE SAME
Filed May 7, 1928
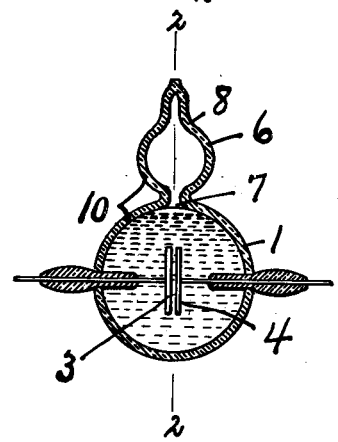
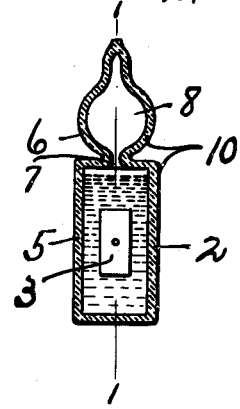
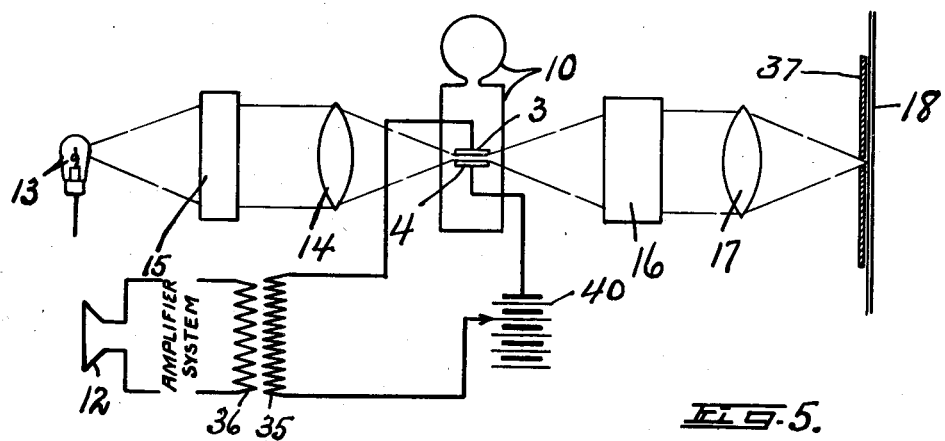
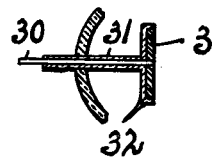
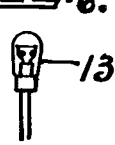
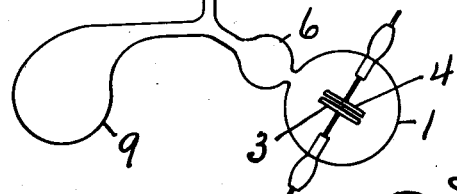
WITNESS
INVENTOR
T.W. Case
BY Denison Thompson
ATTORNEYS Patented Aug. 23, 1932

1,872,675

UNITED STATES PATENT OFFICE

THEODORE WILLARD CASE, OF AUBURN, NEW YORK, ASSIGNOR TO CASE RESEARCH LABORATORY INCORPORATED, OF AUBURN, NEW YORK, A CORPORATION OF NEW YORK

CELL AND METHOD OF MAKING THE SAME

Application filed May 7, 1928. Serial No. 275,805.

This invention relates to certain new and useful improvements in cells and the method of producing the same, and more particularly to cells showing the Kerr effect.

Heretofore cells showing the Kerr effect have had little, if any, practical application, due to various causes, such as breaking down of the liquid solution used, or the gumming or coating of the electrodes, rendering the cell practically inoperative in a short period of time.

I have discovered that if the liquid solution used, such as nitro-benzine, is first degasified and thereafter maintained from air contamination, that a marked improvement results in operation, stability and permanency of the cell.

Further, I have found that if the electrodes are formed of certain metals, especially iron or alloys containing a high percentage of iron, such as steel, that improved results are obtained, and this is particularly true if the exposed surfaces of the electrodes are intentionally oxidized in that the breakdown of the electrodes and the solution in the gap between the electrodes is practically eliminated. The production of electrodes having a stable protective layer of oxide is a feature of this invention, particularly when the electrodes are formed of iron, or preferably an iron alloy, such as steel.

Further, under comparatively high voltage, the cell of this invention will pass comparatively small amounts of current, as compared to cells made using carbon, platinum, or gold electrodes, and in containers which do not absolutely keep the liquid free from gas contamination.

This feature of reducing the current flow just as small as possible is of great importance so that any break down of the liquid, due to electrolysis during action of the cell will not cause the formation or collection of material or particles in the electrode gap, or upon the opposed adjacent surfaces of the electrodes which will affect the operation of the cell.

Further, the cell arrives at a stable condition in a compartively short period of time, and will remain in stable effective condition for comparatively long periods of time.

Other objects and advantages relate to the details of the structure and the method of producing the same, all as will more fully appear from the following description taken in connection with the accompanying drawing, in which:—

Figure 1 is a sectional view of a cell of this invention taken on line 1—1, Figure 2.

Figure 2 is a section taken on line 2—2, Figure 1.

Figure 3 is a diagrammatic illustration of an application of this invention to the production of sound pictures.

Figure 4 is a diagrammatic illustration of an arrangement used in the method of producing the cell.

Figure 5 is a sectional view of a preferred construction of electrode.

Figure 6 shows a straight line filament source of light.

Altho the cell of this invention is capable of use in various places wherever the Kerr effect may be adaptable, such as the production of sound pictures by photography, its adaptation to television, etc., the invention is herein illustrated as more specifically applied to the production of a photographic record of light waves corresponding to sound waves, and the cell is peculiarly adapted for this purpose in that it has for practical purposes no lag, but is capable of use in measuring the speed of light.

As illustrated in the figure, the cell may consist of a glass cylinder —1— which may be formed by cutting off a ring of g702–p glass tubing. The ring may be, for illustration, of a diameter of 1¼" and 1½" in axial length. A 702–p flat round glass window —2— may be sealed on one side of the ring or cylinder —1—. The electrodes —3— and —4— are preferably constructed, as shown in Figure 5, in which the lead-in wire or support —30— is provided with an insulating coating 31 and the outside surface and the edge of the electrodes —3— and —4— are provided with an insulating coating —32—. This coating can be provided in any suitable way, but at present I prefer the following method:—

The electrodes are dipped one or more times into a glass enamel solution, dependent upon the thickness of the insulation desired, and this glass enamel is then baked or fused upon the electrode so as to cover the entire surface of the electrode, including the lead-in wire or support. The enamel coating is then ground off the active surface to expose the steel electrode leaving all the electrode and lead-in wire insulated except said active face, as illustrated. Electrodes so constructed act to concentrate the effect where it is wanted, and results in operation at less voltage, the cell draws less current, and comes to equilibrium much quicker after applying the current. However, uncoated electrodes and wire may be utilized, as shown in Fig. 1, with less preferable results.

The electrodes —3— and —4— are preferably formed of carbon steel, altho other metals, such as iron or iron alloys may be used, for illustration, flat plates ½″ long by ¼″ wide, and their opposed adjacent surfaces are preferably substantially flat, and by some suitable means these opposed adjacent surfaces are provided with a superficial stable oxide coating which prevents, or at least allays chemical action at the surfaces, and practically eliminates gumming up of the electrodes and breaking down of liquid in the gap between the electrodes.

These oxidized surfaces may be produced by heating the electrodes in air, or can be produced before the electrodes are placed within the cylinder —1— by acid treatment.

The electrodes may then be sealed into the cylinder —1— and may be spaced apart any suitable distance, as for instance a distance of perhaps 2 to 15 thousandths of an inch, altho at present six or seven thousandths of an inch is deemed preferable and the electrodes should be arranged parallel in their spaced relation.

When the electrodes have been sealed in and properly positioned for permanent support, the flat glass window —5— is sealed in place, and the tubulation —6— is sealed into an opening —7— in the cylinder —1— at the upper portion of the cylinder. This tubulation is enlarged at an intermediate point along its length to form an expansion chamber —8—. As best illustrated in Figure 4, in the method of producing the cell, the opposed end of the tube —6— is sealed into a glass bulb —9— which may be disposed above the cell —10— which consists of the cylinder —1—, the glass windows —2— and —5—, the tubulation —6— and the electrodes —3— and —4—, and may be so disposed as to contain and hold a suitable quantity of a desired liquid, such as chemically pure nitro-benzine. The bulb —9— is connected as by tube —20— which may be of any suitable length, to a flexible or rubber tubing —11— which leads to a pumping device for producing the required vacuum in the structure illustrated in Figure 4.

In the method of manufacture, the pump or vacuum-producing device is then started, and the liquid in bulb —9— is heated somewhat as by a Bunsen burner, and a vacuum is drawn for a sufficient period of time to remove substantially all air from the system and to practically completely degasify the liquid in the bulb —9—.

This process may require, for illustration, a period of 15 minutes. When the complete removal of air and degasification of the liquid has been effected, the rubber tubbing —11— permits tipping of the apparatus, shown diagrammatically in Figure 4, so that the degasified nitro-benzine can be poured from bulb —9— into the cell —10—, filling the cell substantially up to the opening —7— leading to the expansion chamber —8—. The vacuum devices preferably may remain connected for a further period of time, while the liquid is heated in the electrode chamber. The cell is then sealed off by a constriction in the tabulation —6— shortly above the expansion chamber —8—.

During the process of removing the air from the system shown in Figure 4, it is deemed preferable after the liquid is poured into cell —10— to connect the electrodes —3— and —4— in the circuit with a source of potential while maintaining the vacuum connection and allowing the liquid to become more non-conducting, due to action of the current before sealing off from the vacuum pump, and also preferable to again heat the cell and liquid in it after the current has been stopped and before sealing off.

As understood at present, an important feature of the completed cell, as distinguished from known cells, consists in the fact that the liquid, such as nitro-benzine, has been degasified and by the sealing of the cell is maintained thereafter at all times in degasified condition, and further, that a vacuum is maintained in the cell, the degree of such vacuum depending upon the vapor pressure of nitro-benzine, some of which vapor will exist in the expansion chamber —8—.

Other important features reside in the particular form, construction and material of the electrodes, and the use of the expansion chamber —8— for receiving and containing vapor given off by the liquid used during operation of the cell, which may result in considerable heating of the liquid if alternating current be used.

As cells of this type showing the Kerr effect operate upon the principle of effecting rotation of polarized light, the cell as diagrammatically illustrated in Figure 3 may be utilized for the production of sound pictures by connecting the electrodes —3— and —4— in circuit with a source of variable potential —40— and the secondary —35— of a transformer, the primary —36— of which is connected through any number of stages of amplification desired, with a modulated circuit, as for instance including a microphone —12— and then passing light from a source of light rays, as the straight line filament lamp —13— with the filament parallel with the electrodes, through a Nicol polarizer —15— and a lens or lens-system —14—, by means of which it is focussed to the space between the electrodes —3— and —4—. The light rays issuing from between the electrodes —3— and —4— are in turn passed through a Nicol analyzer —16— through a lens or lens-system 17 by means of which the light rays are focussed upon a sensitive surface or film —18—. The rays may be passed through an extremely narrow slit in an opaque curtain —37— upon the sensitive surface, if desired, in a well known manner. The voltage of battery —40— is such as to cause the passage of some light to the film. When there is no modulation, the voltage is set to let through the proper amount of light, and in sound recording this is modulated up and down, as by microphone to produce a photographic record corresponding to sound waves.

The result is a photographic record of light wave variations which conform sharply and accurately to the electrical variations in the circuit including electrodes —3— and —4—, due to the fact that there is practically no lag in this type of cell, and as a result, it is capable of following variations in the electric current with sufficient rapidity and accuracy to produce an improved record.

The removal of the gases from the liquid, such as nitrobenzine, and the subsequent maintenance of this removal eliminates so-called "boiling" between the electrodes, which boiling has a deleterious effect upon the light to be modulated and photographed on the film. The liquid in such a cell as is here described becomes such a good dielectric that upon applying the E. M. F. on the electrodes, one can actually see the liquid itself rotate in a cell with a spacing of 12 thousandths of an inch, and varying the E. M. F. at the electrodes will correspondingly vary the polarized light rays passing between the electrodes so that the issuing light after passage through an analyzer will vary in accordance with the original sound waves acting upon the circuit containing the electrodes.

Whether these cell effects are electrostatic effects, as heretofore assumed, or are the result of the actual passage of current between the electrodes, need not be positively stated, but my work at present leads me to believe that they are the result in large part of the actual passage of current.

When it is stated herein that the electrodes are formed of iron, steel or some alloy containing a large percentage of iron, the word "electrodes" is deemed to mean the active surface or surface portion of the electrode, as such materials may be coated on or otherwise secured to a support of different material in the production of a complete electrode structure.

Altho I have shown and described a specific structure with perhaps preferred details of form, size and arrangement of the parts thereof, I do not desire to restrict myself to the same, as various changes and modifications may be made within the scope of the appended claims.

I claim:

1. A cell capable of showing the Kerr effect comprising an evacuated air-tight chamber, a pair of spaced electrodes in the chamber, and a degasified liquid surrounding the electrodes.

2. A cell capable of showing the Kerr effect comprising an air-tight structure evacuated of gases including an electrode chamber and a pair of spaced electrodes therein.

3. A cell capable of showing the Kerr effect comprising an air-tight structure evacuated of gases including an electrode chamber, a pair of spaced electrodes therein, and an expansion chamber communicating with the electrode chamber.

4. A cell capable of showing the Kerr effect comprising an air-tight chamber evacuated of gases, a pair of spaced electrodes in the chamber, a degasified liquid surrounding the electrodes, a circuit connecting the electrodes, and means for impressing electrical variations upon the circuit.

5. A cell capable of showing the Kerr effect comprising an air-tight structure evacuated of gases including an electrode chamber, a pair of spaced electrodes therein, a circuit connecting the electrodes, and means for impressing electrical variations upon the circuit.

6. A cell capable of showing the Kerr effect comprising an air-tight structure evacuated of gases including an electrode chamber, a pair of spaced electrodes therein, an expansion chamber communicating with the electrode chamber, a circuit connecting the electrodes, and means for impressing electrical variations upon the circuit.

7. The method of producing a cell capable of showing the Kerr effect comprising enclosing a pair of spaced electrodes in a structure closed except for a pump connection, placing a desired liquid in said structure, heating the liquid, evacuating the interior of the structure of gases while the liquid is heated to degasify the liquid, and sealing the degasified liquid in the structure containing the electrodes.

8. The method of producing a cell capable of showing the Kerr effect comprising mounting a pair of electrodes in an electrode chamber, placing a desired liquid in another chamber in communication with the electrode chamber, evacuating the connected chambers of gases, pouring the liquid into the electrode chamber, and then sealing the electrode chamber to produce an air-tight structure.

9. The method of producing a cell capable of showing the Kerr effect comprising mounting a pair of electrodes in an electrode chamber, placing a desired liquid in another chamber in communication with the electrode chamber, heating the liquid, evacuating the connected chambers of gases, pouring the liquid into the electrode chamber, and then sealing the electrode chamber to produce an air-tight structure.

10. A cell capable of showing the Kerr effect comprising an air-tight chamber, a degasified liquid within the chamber, a pair of spaced electrodes immersed in the liquid, said electrodes formed of a material including a high percentage of iron and having their surfaces provided with a protective oxide coating.

11. The method of producing a cell capable of showing the Kerr effect comprising mounting a pair of spaced electrodes in a structure closed except for a pump connection, placing a desired liquid in such structure, evacuation of the interior of the structure of gases, impressing a voltage on said electrodes for a time under vacuum, and finally sealing the liquid, degasified, in the structure containing the electrodes.

12. The method of producing a cell capable of showing the Kerr effect comprising enclosing a pair of spaced electrodes in a structure closed except for a pump connection, placing a desired liquid in such structure so as to immerse the electrode and evacuating the structure while impressing a voltage on said electrode 13. A cell capable of showing the Kerr effect comprising an evacuated gas-tight chamber made entirely of glass, metal electrodes within said chamber, lead-in wires fused in the walls of said chamber connected to and supporting said electrodes, and a degasified double refractory liquid surrounding the electrodes within the chamber.

14. A cell capable of showing the Kerr effect comprising an evacuated gas-tight chamber made entirely of glass, two electrodes containing a high percentage of iron within said chamber, lead-in wires fused in the walls of said chamber connected to and supporting said electrodes, and a de-gasified double refractory liquid surrounding the electrodes within the chamber.

15. A cell capable of showing the Kerr effect comprising an evacuated gas-tight chamber made entirely of glass, two electrodes one of which contains a high percentage of iron within said chamber, lead-in wires fused in the walls of said chamber connected to and supporting said electrodes, and a de-gasified double refractory liquid surrounding the electrodes within the chamber.

16. A cell capable of showing the Kerr effect comprising an air-tight chamber, a degasified liquid within the chamber, a pair of spaced electrodes immersed in the liquid, said electrodes being composed of a material including a high percentage of iron and having their active surfaces roughened and provided with a protective oxide coating 17. A cell capable of showing the Kerr effect comprising an air-tight chamber, a degasified liquid within the chamber, a pair of spaced electrodes immersed in the liquid, said electrodes having their opposed faces roughened whereby the active surface is increased without increasing the linear dimensions of the electrodes.

18. In a light modulator, an evacuated cell containing a degasified liquid, and a pair of spaced electrodes immersed in said liquid.

In witness whereof I have hereunto set my hand this twenty-fifth day of April, 1928.

THEODORE WILLARD CASE.